United States Patent [19]

Simm

[11] 3,994,258
[45] Nov. 30, 1976

[54] APPARATUS FOR THE PRODUCTION OF FILTERS BY ELECTROSTATIC FIBER SPINNING

[75] Inventor: Walter Simm, Leverkusen, Germany

[73] Assignee: Bayer Aktiengesellschaft, Leverkusen, Germany

[22] Filed: May 28, 1974

[21] Appl. No.: 474,292

[30] Foreign Application Priority Data
June 1, 1973   Germany............................ 2328015

[52] U.S. Cl. ............................ 118/626; 118/638; 264/10; 427/31
[51] Int. Cl.² .......................................... B05C 5/02
[58] Field of Search ........... 118/620, 621, 626, 638; 427/13, 31, 32; 264/10, 24

[56] References Cited
UNITED STATES PATENTS

| | | |
|---|---|---|
| 1,975,504 | 10/1934 | Formhals ............................ 264/10 |
| 2,680,079 | 6/1954 | Huebner ............................ 118/626 |
| 2,777,784 | 1/1957 | Miller ............................ 118/626 X |
| 2,810,426 | 10/1957 | Till et al. ............................ 264/24 |
| 3,406,660 | 10/1968 | Simm ............................ 118/626 |
| 3,475,198 | 10/1969 | Drum ............................ 118/638 |
| 3,490,115 | 1/1970 | Owens et al. ............................ 118/621 |

OTHER PUBLICATIONS
Def. Pub. 665476 Morrison et al. Sept. 5, 1967.

*Primary Examiner*—Mervin Stein
*Attorney, Agent, or Firm*—Burgess, Dinklage & Sprung

[57] ABSTRACT

In a process for the production of fiber filters, spinning solutions are electrostatically sprayed and deposited continuously onto a gas-permeable band-form support. The band-form support travels successively through several spray zones and is always guided from one spray zone into the next below the spray electrodes. Row arrangements of rotating rings dipping into the spinning liquid are used as the spray electrodes, the rings of one row lying in one plane.

9 Claims, 6 Drawing Figures

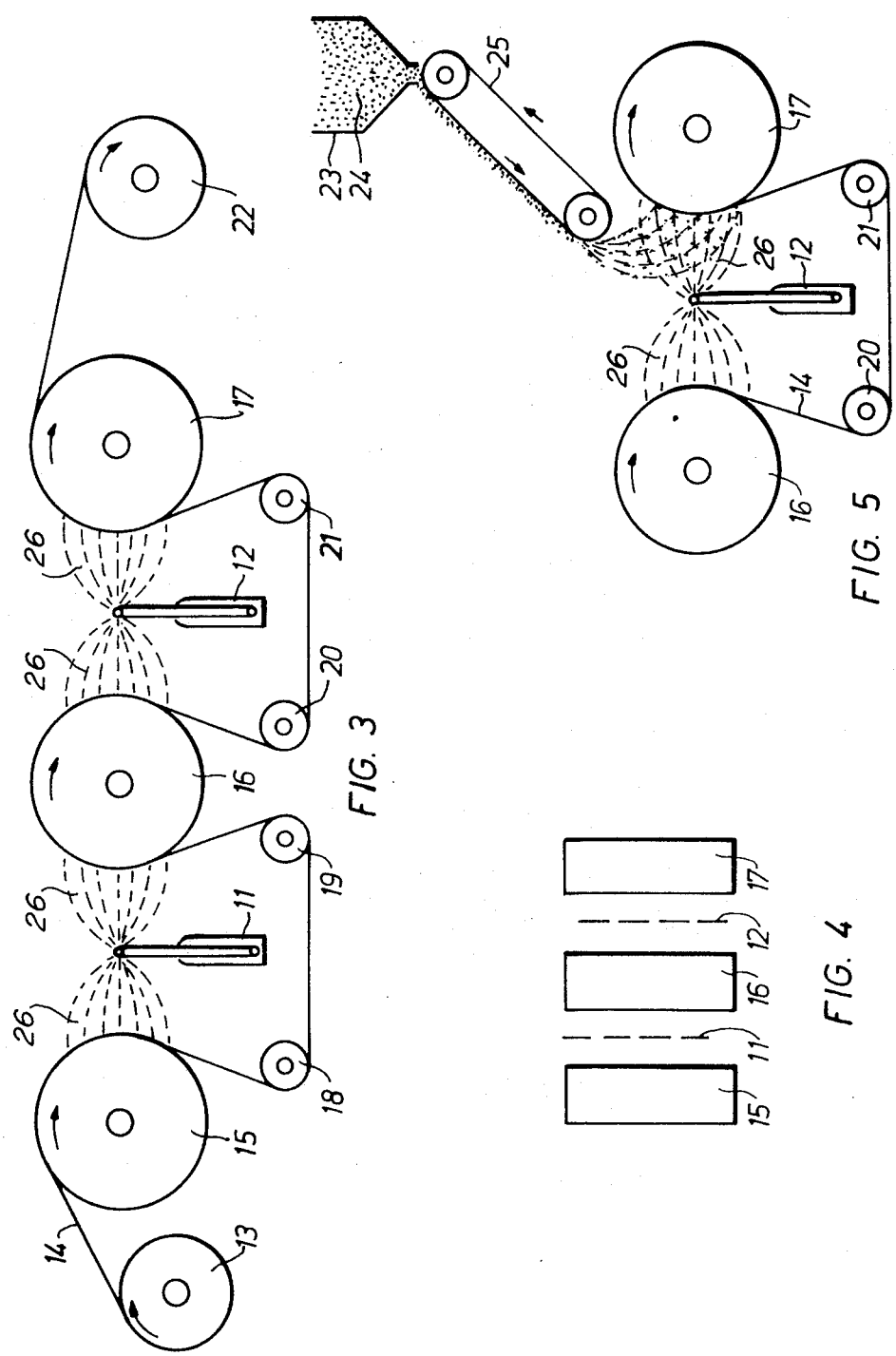

APPARATUS FOR THE PRODUCTION OF FILTERS BY ELECTROSTATIC FIBER SPINNING

This invention relates to an apparatus for the production of fibre filters by electrostatically spraying fibres onto a gas-permeable support.

In known processes for electrostatically spraying spinning solutions, the fibrous material formed is deposited in the form of a "mat" with outstanding filter properties onto a gas-permeable support, for example a self-supporting fabric. The liquid is preferably sprayed and spun through ring-shaped spraying electrodes which dip into a container filled with the spinning solution and which are wetted with the liquid over their entire surface by means of a rotational movement. Strong electrical fields are produced around the ring electrodes by means of high voltage deposition electrodes. Under the effect of these strong electrical fields, the spinning liquid is drawn off in the form of filaments from the open parts of the rings and deposited in the form of a fibre layer at the deposition electrodes which are covered by a supporting fabric. By continuously displacing the electrode surface and the support during spinning, it is thus possible to produce a coherent filter cloth (see German Offenlegungsschrift No. 2,032,072).

In one simple form, the deposition electrodes are rotating metal rollers over which a band-form supporting web or supporting fabric is drawn.

The productivity of an arrangement of this kind so far as the manufacture of filter cloths is concerned is relatively low, because the electrostatic spraying of the spinning liquid and the drying of the liquid filaments in the spraying compartment are only possible with a certain, maximum fibre density which, for cloths of acceptable thickness, only allows band take-off rates of a few centimetres per minute.

The object of the invention is to obtain greater productivity in filter manufacture with arrangements involving lower outlay and less space. This necessitates higher takeoff rates with a given web width of a few meters which is suitable for further processing of the cloth. An additional requirement is the uniform density distribution of the fibre material on the supporting band. Since the ring electrodes described above spray the fibre material more effectively in certain zones than in others, another object of the invention is to optimally utilise these zones while at the same time using several ring electrodes in order to improve productivity, and to equalise the deposition of fibres distributed over a fairly large area.

According to the invention, there is provided a process for producing fibre filters by electrostatically spraying a spinning solution by means of spray electrodes and depositing the fibres formed onto a gas-permeable support, wherein the support travels successively through a plurality of spray zones each comprising at least one spray electrode and is guided from one spray zone into the next below the spray electrodes.

There is also provided a process, wherein each spray zone comprises a row of rotatable ring electrodes lying in one plane each dipping in the spinning solution.

The apparently obvious guiding above the spray electrodes involves considerable difficulties, because the guide rollers would in this case have to be arranged in the vicinity of the spray zones where they would be exposed to heavy soiling and fouling. In addition, the path of the band used in the method according to the invention ensures the necessary good contact between the band and the deposition electrodes in the vicinity of the zones of optimum spraying effect. In cases where the axes of rotation of the ring electrodes are horizontal, the optimum spray zones are situated on both sides of the ring plane at substantially the level of the upper half of the ring.

The necessity of using several rings in a confined space generally leads to marked disturbances in spraying through high electrical space charges and mutual screening of the electrodes.

A preferred arrangement of the rings according to the invention for optimum packing density and productivity is a row arrangement such that all the rings of one row lie closely adjacent one another in one plane, so that their axes of rotation extend parallel to one another. The deposition electrodes are preferably cylindrical and arranged on both sides of the row of ring electrodes in such a way that the longitudinal axes of the cylinders extend parallel to the row. In an electrode arrangement of this kind, the fibres are, of course, not deposited in a completely uniform layer thickness on the surface of the deposition electrodes. The nonhomogeneous field distribution attributable to the ring form of the spray electrodes gives rise to excessive fibre deposition near the middle of a ring and to deficient fibre deposition in the transition zones from one ring to the next.

In regard to the direction of rotation of the rings, the smallest differences in density are obtained with rotation in the same direction. In addition, the spraying effect of each electrode is made uniform by limiting the thickness of the layer of liquid received by the ring after immersion in the spinning liquid. The ideal layer thickness is determined by strippers which remove excess liquid from the ring and return it to the bath.

The rings are mounted on rollers in such a way that they are kept in one plane during rotation. Some of the rollers transmit the rotational movement from a drive shaft common to all the rings to the rings. In order to prevent the drive parts wetted with spinning liquid from sliding off, the contact zones may be provided with teeth or pins.

However, layer thickness can only be completely equalized over the entire width of the mat of fibres formed when at least two spinning zones formed from row arrangements of ring electrodes in combination with the corresponding deposition electrodes are introduced successively into the operation, and one row of electrodes offset in relation to the next in such a way that the zones low in fibre density produced by one row are covered by the zones of high fibre density produced by another row.

According to the invention, the band-form support for the layer of fibres is guided by guide rollers in such a way that after passing the first deposition zone of one spinning zone, it moves forward underneath the row of spray electrodes and is subsequently guided upwards into the second deposition zone, the band being partly looped around the spray electrodes.

In this way, the band travels successively through one spinning zone after the other and the fibre material is applied in layers.

As a result, it is possible to produce mixed mats of different types of fibres when spinning solutions of different kinds are sprayed into the spinning zones. Filter cloths of mixed fibres can be of interest for reasons of strength, gas permeability, electrical charge distribution in the layer and for reasons of material costs. Spinning solutions of different kinds are, for example, solutions of polycarbonate, polystyrene and cellulose esters in methylene chloride.

Another possibility of producing mixed "mats" and for improving productivity is to scatter fillings in the form of flocks or short staple fibres into the spray zones during spinning. These fillings are electrically charged by the presence of charged gas ions of in the spraying zone and deposited with the fibres at the deposition electrodes.

Accordingly, they are simultaneously spun into the layer of fibres.

In this way, it is also possible to produce mixed mats containing substances which, basically, are insoluble and cannot be spun. The addition of filling material produces a loose mat and improves gas permeability. Examples of suitable fillings include polyacrylonitrile and polyamide fibres a few mm in length. An example of a flock-like filling material is ground polyurethane foam. The proportion of filling can be varied within wide limits by suitable dosage during addition.

The process according to the invention is described in the following with reference to the accompanying drawings. wherein:

FIG. 3 illustrates the path followed by a support through two successive spinning zones.

FIG. 4 diagrammatically illustrates the stagger of the rings in two spinning zones.

FIG. 5 shows a spinning zone in whose spray zones fillings have been scattered.

Figure 1:
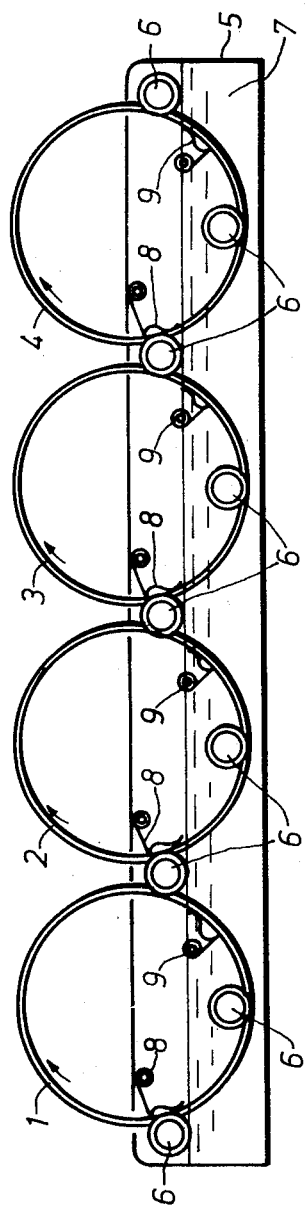
FIG. 1 shows a row arrangement of ring electrodes.

As shown in FIG. 1, four ring electrodes 1 to 4 are accommodated in a common container 5 containing a spinning solution 7 each ring being kept in the rotational plane by three guide rollers 6. The rings dip at their lower ends into the spinning solution 7. By a common drive through some of the rollers, for example through the five upper rollers, the rings are rotated in the directions indicated by arrows. The rings can have diameters of, for example from 200 to 1000 mm and a thickness of, preferably, from 1 to 10 mm. Strippers 8 consisting of a flat, preferably resilient material, limit the adhering layer of liquid to an extent acceptable for spinning at the outlet of each ring. At their point of contact with the ring, the strippers either form straight edges or surround part of the ring in fork form. They can also be in the form of bored-out discs completely surrounding the ring section at this point. Due to evaporation of solvent, the spinning solution on the surface of the ring readily thickens as the ring passes through the air. Accordingly, it is advantageous to remove the residual deposits by means of second strippers 9 in the liquid bath.

Figure 2B:
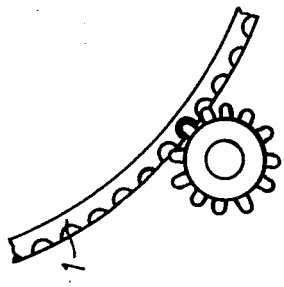
FIG. 2b shows a detail of the drive arrangement.
Figure 2A:
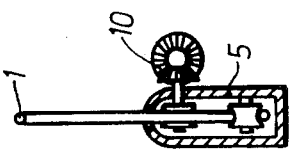
FIG. 2a shows a drive arrangement for the ring electrodes, comprising a common drive shaft.

FIG. 2a is a cross-section showing the ring 1 and the container 5 showing the possibility of drive from a common shaft through bevel gears 10. Pins provided for avoiding slip between a ring and a drive roller are shown in FIG. 2b.

In FIG. 3, the parts 11 and 12 represent row arrangements of ring electrodes as shown in FIG. 1 in two spinning zones. A supporting band 14 is off-wound from a supply roll 13, continues without interruption over rotatably mounted cylindrical deposition electrodes 15, 16 and 17 and guide rollers 18 to 21, where the layer of fibres is received, and terminates at a winding unit for the finished mat 22. In this way, each part of the band travels through the four spray zones on both sides of the ring electrodes and the spinning solution is dispersed as sprays 26 in the spray zones.

As shown in FIG. 4, the electrodes of the spray zones 11 and 12 are offset relative to one another to such an extent that the middle of one electrode of the spray zone 11 coincides with the gap between two electrodes of the spray zone 12 as seen in the direction of travel of the band. The members of the arrangement in FIGS. 3 and 4 can of course be multiplied.

As shown in FIG. 5, a free-flowing filling 24 is uniformly scattered from a supply container 23 by means of a conveyor belt 25 in the spray area between the spray zone 12 and the deposition electrode 17 and spun in with the fibres on the supporting band 14 by means of the electrode 17. In this way, it is possible to incorporate a non-spinnable filling material in the filter cloth.

What we claim is:

1. Apparatus suitable for producing fibre filter material by electrostatic spraying of spinning solution to form fibres and collecting the fibres to form the fibre filter material on a gas permeable support, comprising
   a. a plurality of spaced, side-by-side, rotatably mounted ring electrodes, deposition electrode means on each side of each ring electrode, the deposition electrode means being spaced from the ring electrodes for providing spray zones between the ring electrodes and the deposition electrode means,
   b. guide means for guiding the gas permeable support successively through the spray zones, said guide means including rollers disposed below the ring electrodes for passage of the gas permeable support beneath each ring electrode for transfer of the gas permeable support from one side of the ring electrode to the other side thereof.

2. Apparatus of claim 1, wherein for each of said ring electrodes there is at least one additional such ring electrode lying in the same plane so that there are a plurality of spaced, side-by-side rows of ring electrodes with the electrodes of each row lying in the same plane; the rows being parallel.

3. Apparatus of claim 2, the deposition electrode means being cylindrical, the axes of the cylindrical deposition electrode means being parallel to the rows of ring electrodes.

4. Apparatus of claim 3, the cylindrical deposition electrode means being mounted for rotation about the axes thereof.

5. Apparatus of claim 1, comprising containers for the ring electrodes for holding the spinning solution, the ring electrodes dipping into the container for taking up of spinning solution, and strippers mounted in the containers for limiting the thickness of solution taken up by the ring electrodes.

6. Apparatus of claim 2, including a drive roller for one of the ring electrodes of each row, and means for transmitting rotation from said driven electrode to the remaining electrodes of the row.

7. Apparatus of claim 6, and means for preventing slip of the driven ring electrodes.

8. Apparatus of claim 2, wherein the ring electrodes of each row are staggered relative to the ring electrodes of the next adjacent row.

9. Apparatus suitable for producing fibre filter material by electrostatic spraying of spinning solution to form fibres and collecting the fibres to form the fibre filter material on a gas permeable support, comprising
 a. a plurality of spaced, side-by-side, rows of rotatably mounted ring electrodes, the electrodes of each row lying in the same plane, deposition electrode means on each side of each row of ring electrodes, the deposition electrode means being spaced from the ring electrodes for providing spray zones between the ring electrodes and the deposition electrode means,
 b. guide means for guiding the gas permeable support successively through the spray zones,
 c. the ring electrodes of each row are staggered relative to the ring electrodes of the next adjacent row.